Patented Aug. 17, 1943

2,327,119

UNITED STATES PATENT OFFICE 2,327,119

PROCESS OF MAKING AMINO ACIDS

Elmore Louis Martin, Wilmington, Del., assignor to E. I. du Pont de Nemours & Company, Wilmington, Del., a corporation of Delaware No Drawing. Application February 6, 1941, Serial No. 377,742

5 Claims. (Cl. 260—534)

This invention relates to a process for preparing long chain omega-aminocarboxylic acids.

The long chain omega-aminocarboxylic acids are useful as intermediates for further synthesis. Epsilon-aminocaproic acid, for example, is a valuable ingredient in the manufacture of polyamides and of interpolyamides of the type described in U. S. Patents 2,071,253 and 2,130,948. These long chain omega-aminocarboxylic acids have been obtained from omega-aminonitriles and lactams by the following methods: (1) by hydrolysis with hydrochloric acid and neutralization of most of the hydrochloric acid with lead oxide, precipitation of the remaining chloride ions with silver oxide and removal of the residual lead ions with hydrogen sulfide or (2) by hydrolysis with excess aqueous sulfuric acid, precipitation of the sulfate ions with calcium oxide, removal of the residual calcium sulfate by the addition of barium hydroxide and precipitation of barium and calcium ions by means of carbon dioxide. These methods, however, require extended reaction periods and the product obtained is invariably contaminated with considerable inorganic material.

This invention has as an object a new and improved process for the preparation of long chain omega-aminocarboxylic acids. Other objects will appear hereinafter.

These objects are accomplished by hydrolyzing the omega-aminonitriles, lactams and other suitable compounds referred to more particularly below with aqueous barium hydroxide, treating the hydrolyzate so as to remove the barium as an insoluble barium compound, separating the barium compound, and isolating the amino acid either by concentration or by addition of a water-miscible organic compound which is a poor solvent for the amino acid.

In addition to the omega-aminonitriles, R'R''N—R—C⋮N, and lactams

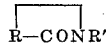

the long chain omega-amino acids can be obtained by the present process from low molecular weight polymers derived from omega-amino acids and from omega-aminoamides of the general formula R'R''NRCONH$_2$. In these formulae R' and R'' are univalent hydrocarbon radicals or hydrogen atoms, and R is a divalent organic radical having chain length of at least 5 atoms, of which the two terminal atoms are crbon, and characterized by having one of the terminal valences satisfied by an amino nitrogen atom and the other by a nitrile or carbonamide group. In the case of the lactams the amino nitrogen atom is also part of the carbonamide group.

In the preferred method of carrying out the invention one chemical equivalent of a compound of the above mentioned type is heated with at least one chemical equivalent of aqueous barium hydroxide under a reflux condenser, the reaction proceeding with the vigorous evolution of ammonia when aminonitriles are used. The time required for complete hydrolysis of most aminonitriles and lactams is about 4 to 6 hours, but highly substituted lactams and water-insoluble aminonitriles require longer reaction periods. As soon as the hydrolysis is complete, a stream of carbon dioxide is passed into the hot, agitated reaction mixture until a test portion after removal of the precipitated barium carbonate gives no test for barium ions when treated with carbon dioxide. After the precipitation of the barium ion is complete the mixture is digested at 90–95° C., the inorganic precipitate of barium carbonate is removed either by filtration or by centrifuging and the filter cake washed several times with hot water. The original filtrate and washings are combined, treated with a trace of dilute sulfuric acid to complete the removal of barium ions, the mixture treated with decolorizing charcoal and the colorless filtrate concentrated either under reduced pressure or at atmospheric pressure. The long chain omega-aminocarboxylic acids are isolated by cooling or by the addition of a water-miscible compound which is a poor solvent for the amino acids. An additional quantity of good quality amino acid can be obtained by concentrating the mother liquors, dissolving the residue in water, treating with decolorizing charcoal, and isolating the amino acid as described above.

The following examples in which the quantities of reagents are parts by weight illustrate in greater detail the processes of this invention.

*Example I*

A mixture of 336 parts of epsilon-aminocapronitrile having a neutral equivalent of 112.0, 630 parts of barium hydroxide octahydrate and 1000 parts of distilled water was placed in a reaction vessel fitted with an efficient reflux condenser carrying a gas absorption trap and the mixture refluxed gently. The reaction proceeded with the vigorous evolution of ammonia and to prevent the loss of aminonitrile the source of heat was removed. After the initial vigorous reaction had subsided, the mixture was refluxed gently for a period of 12 hours, the evolution of ammonia being complete at the end of 3 hours. The source of heat was again removed and into the hot agitated reaction mixture was passed a stream of carbon dioxide gas until a test portion, after filtration to remove the precipitated barium carbonate, gave no further precipitate when treated with carbon dioxide. The mixture was digested at 90° to 95° for one hour, filtered, the filter-cake pressed as dry as possible, and washed with three portions of boiling water. To the very nearly colorless filtrate was added four parts of 10% sulfuric acid, the mixture heated to boiling, treated with 10 parts of decolorizing charcoal, and the colorless filtrate concentrated on a steam bath under reduced pressure until crystals of epsilon-aminocaproic acid began to separate. The vacuum was released and the precipitated amino acid brought into solution by heating. To the hot solution was added 1000 parts of pure ethanol, the solution cooled to 15° in an ice bath with occasional stirring during a period of 4-6 hours, the crystallized amino acid collected, washed with 300 parts of pure methanol, and dried on a steam bath under reduced pressure. The yield of epsilon-aminocaproic acid melting at 201° to 203° C. was 325 parts or 83% of the theoretical amount. By working up the mother and wash liquors an additional quantity of 30 parts of good quality amino acid was obtained.

*Example II*

Following the general procedure outlined in Example I, a mixture of 224 parts of epsilon-aminocapronitrile, 350 parts of barium hydroxide octahydrate, and 600 parts of distilled water was refluxed for four hours, the barium precipitated as barium carbonate, the solution treated with decolorizing carbon, and the filtrate concentrated to a weight of 450 parts. To the hot solution was added 320 parts of methanol followed by the addition of 320 parts of acetone. After cooling thoroughly the precipitated amino acid was collected, washed with methanol, and dried. The yield of amino acid was 235 parts or 90% of the theoretical amount. An additional quantity of 22 parts was obtained by working up the mother and wash liquors.

*Example III*

Following the general procedure outlined in Example I, a mixture of 900 parts of barium hydroxide octahydrate, 1000 parts of distilled water, and 650 parts of crude epsilon-caprolactam obtained by the rearrangement of cyclohexanone-oxime was refluxed for 10 hours. After precipitation of the barium carbonate, filtration, decolorization, concentration, and crystallization of the amino acid by the addition of alcohol, 460 grams of pure epsilon-aminocaproic acid was obtained.

*Example IV*

Following the general procedure outlined in Example I, a mixture of 12 parts of the lactam obtained by the rearrangement of menthone oxime, 15 parts of barium hydroxide octahydrate and 100 parts of distilled water was refluxed during 36 hours as the hydrolysis of the substituted lactam was slower than that of the unsubstituted lactams previously investigated. The amino acid was obtained from the aqueous filtrate after removal of the barium carbonate by concentration under reduced pressure. It was not necessary to add a water-miscible organic solvent to precipitate the amino acid. The yield of amino acid melting at 198° to 200° C. was 6 parts. An additional quantity of pure amino acid was obtained by concentrating the mother liquor.

*Example V*

Following the general procedure outlined in Example I, a mixture of 33.4 parts of the lactam obtained by the rearrangement of beta-decalone-oxime, 25 parts of barium hydroxide octahydrate and 150 parts of water was refluxed for a period of 17 hours. After precipitation of the barium as barium carbonate, filtration and decolorization, the colorless filtrate was concentrated under reduced pressure on a steam bath until its weight was 50 parts. To the colorless solution was added 200 parts of obsolute ethanol and in order to bring about precipitation of the amino acid, anhydrous ethyl ether was added until the solution became cloudy. The amino acid was purified by recrystallization from alcohol-water-ether mixture and melted at 191–195° C.

*Example VI*

Following the general procedure outlined in Example I, 130 parts of 7-aminoheptanonitrile (neutral equivalent 125.7), 210 parts of barium hydroxide octahydrate and 500 parts of distilled water yielded 100 parts of 7-aminoheptanoic acid melting at 195° C. An additional quantity of fair quality amino acid was obtained by concentration of the mother and wash liquors.

*Example VII*

Following the general procedure outlined in Example I, 126 parts of 10-aminocaprinitrile, $H_2N-(CH_2)_9-CN$, 140 parts of barium hydroxide octahydrate, and 1000 parts of distilled water yielded 118 parts of pure 10-aminocaproic acid, M. P. 185° to 188° C., which crystallized on cooling the decolorized aqueous filtrate obtained after removal of the barium carbonate.

Other examples of long chain omega-aminonitriles useful in the present process are:

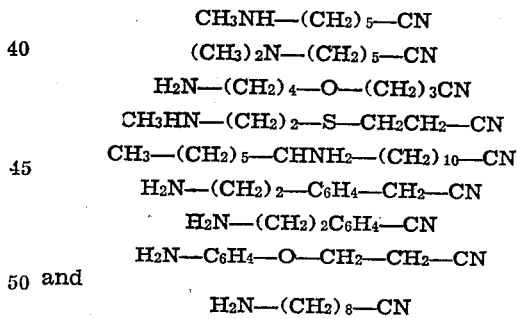

$CH_3NH-(CH_2)_5-CN$ $(CH_3)_2N-(CH_2)_5-CN$ $H_2N-(CH_2)_4-O-(CH_2)_3CN$ $CH_3HN-(CH_2)_2-S-CH_2CH_2-CN$ $CH_3-(CH_2)_5-CHNH_2-(CH_2)_{10}-CN$ $H_2N-(CH_2)_2-C_6H_4-CH_2-CN$ $H_2N-(CH_2)_2C_6H_4-CN$ $H_2N-C_6H_4-O-CH_2-CH_2-CN$ and $H_2N-(CH_2)_8-CN$ The cyclic lactams mentioned in the examples may be replaced by a large variety of compounds, examples of which are:

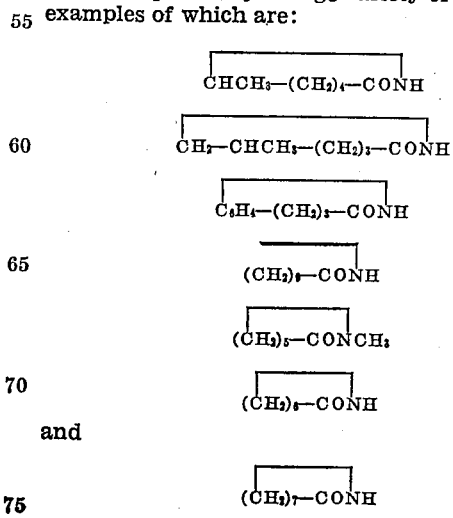

and

The aminoamides useful in the present process are represented by compounds such as $$H_2N—(CH_2)_5CONH_2$$
$$H_2N—(CH_2)_6—CONH_2$$
$$H_2N—(CH_2)_8—CONH_2$$
$$H_2N—(CH_2)_9—CONH_2$$
$$CH_3—(CH_2)_5—CHNH_2—(CH_2)_{10}—CONH_2$$
$$H_2N—CH_2—C_6H_4—CH_2—CONH_2$$
$$H_2N—(CH_2)_3—O—(CH_2)_2—CONH_2$$
$$H_2N—(CH_2)_3—S—(CH_2)_2CONH_2$$
$$H_3CNH—(CH_2)_5—CONH_2$$

and $$(H_3C)_2N—(CH_2)_5—CONH_2$$

In place of the aminoamides there can be used low molecular weight amino acid polymers.

A part of the water used in the examples may be replaced with a water-miscible organic solvent, e. g. alcohols, ketones or cyclic ethers, e. g. dioxane, in order to increase the solubility of the organic compound in the reaction mixture. The molecular ratio of barium hydroxide to long chain omega-aminonitrile or cyclic lactam or aminoamide may be varied within rather wide limits but in its preferred embodiment the ratio of reactants should be at least one mole of barium hydroxide to two moles of organic reactant. It is to be understood that the reference herein to barium hydroxide includes the barium derivatives such as barium oxide, alkoxides of barium, barium nitride, barium sulfide, barium carbide, and barium aluminate, which react with water to yield barium hydroxide. The reaction is most conveniently carried out at atmospheric pressure, but reduced or increased pressures, preferably the latter, can also be used. Compounds other than carbon dioxide which yield relatively insoluble barium derivatives can be used for removal of the barium ions and include such compounds as sulfuric and phosphoric acids, ammonium sulfate, ammonium carbonate and ammonium phosphate.

The long chain omega-aminocarboxylic acids may be isolated from the aqueous solution as described in the examples or by any combination of the methods of the examples, but in general the method best adapted to the isolation of the given long chain omega-aminocarboxylic acid must be determined by experimentation.

The process described herein for preparing long chain omega-aminocarboxylic acids is advantageous because of the relatively short reaction time required and because of the purity of the product obtained. This high purity of the amino acids obtained by the present process makes them particularly suitable in the manufacture of fiber-forming polyamides. The acids prepared in accordance with this invention are also useful as dyestuffs intermediates.

As many apparently widely different embodiments of this invention may be made without departing from the spirit and scope thereof, it is to be understood that I do not limit myself to the specific embodiments thereof except as defined in the appended claims.

I claim:

1. A process for making omega-aminocarboxylic acids which comprises heating with aqueous barium hydroxide a compound containing a divalent organic radical having a chain length of at least 5 atoms terminated by carbon atoms, said divalent organic radical being characterized by having one of the terminal valences satisfied by an amino nitrogen atom and the other by a group selected from the class of nitrile and carbonamide groups, precipitating the barium ion as an insoluble inorganic barium salt, and isolating the resulting amino acid.

2. The process set forth in claim 1 in which said compound containing a divalent organic radical having a chain length of at least 5 is an omega-aminonitrile.

3. The process set forth in claim 1 in which said compound containing a divalent organic radical having a chain length of at least 5 is a lactam derived from an omega-amino acid.

4. A process for making epsilon-aminocaproic acid which comprises heating with aqueous barium hydroxide epsilon-aminocapronitrile, precipitating the barium as an insoluble barium salt, and isolating the resulting epsilon-aminocaproic acid.

5. A process for making omega-aminocarboxylic acids which comprises heating with aqueous barium hydroxide the lactam of an omega-aminocarboxylic acid, precipitating the barium as an insoluble barium salt, and isolating the resulting omega-aminocarboxylic acid.

ELMORE LOUIS MARTIN.